United States Patent

Toyoda

[11] 4,051,491
[45] Sept. 27, 1977

[54] INDICATING EXPOSURE METER FOR A CAMERA

[75] Inventor: Kenji Toyoda, Kawasaki, Japan

[73] Assignee: Nippon Kogaku K.K., Tokyo, Japan

[21] Appl. No.: 635,440

[22] Filed: Nov. 26, 1975

[30] Foreign Application Priority Data

Dec. 3, 1974  Japan .................. 49-137691

[51] Int. Cl.² .................. G03B 17/20; G03B 7/00
[52] U.S. Cl. .................. 354/60 L; 354/53; 356/226
[58] Field of Search .......... 354/23 D, 53, 54, 60 R, 354/60 E, 60 L; 356/226, 227

[56] References Cited

U.S. PATENT DOCUMENTS

| 3,581,643 | 6/1971 | Yoshimura | 354/54 |
| 3,724,955 | 4/1973 | Takahashi et al. | 356/226 |
| 3,883,252 | 5/1975 | Ando | 356/226 |
| 3,959,791 | 5/1976 | Takahashi et al. | 356/226 |
| 3,964,076 | 6/1976 | Ichihashi et al. | 354/60 L |
| 3,967,288 | 6/1976 | Yamamoto | 354/53 |

FOREIGN PATENT DOCUMENTS

| 2,159,162 | 5/1973 | Germany | 354/53 |

*Primary Examiner*—Russell E. Adams
*Attorney, Agent, or Firm*—Shapiro and Shapiro

[57] ABSTRACT

An indicating exposure meter for a camera has an array of indicating elements, each of which has an active and an inactive state ascertainable by inspection, and a circuit responsive both to light from the scene being photographed by the camera, and to the actual setting of the exposure factors of the camera for controlling the state of each indicating element. The magnitude as well as the direction of the displacement of the setting of the exposure factors from the correct setting is ascertainable from visual inspection of the location of the active indicator elements in the array.

2 Claims, 3 Drawing Figures

| | 8a | 8b | 8c | 8d | 9 | 11a | 11b | 11c | |
|---|---|---|---|---|---|---|---|---|---|
| $V_L < V_1$ | L | L | H | H | H | ○ | X | X | ----A |
| $V_1 < V_L < V_2$ | H | L | H | H | L | ○ | ○ | X | ----B |
| $V_2 < V_L < V_3$ | H | H | H | H | L | X | ○ | X | ----C |
| $V_3 < V_L < V_4$ | H | H | L | H | L | X | ○ | ○ | ----D |
| $V_4 < V_L$ | H | H | L | L | H | X | X | ○ | ----E |

INDICATING EXPOSURE METER FOR A CAMERA

BACKGROUND OF THE INVENTION

FIELD OF THE INVENTION

The present invention relates to an indicating exposure meter for a camera, and more particularly to an exposure meter utilizing indicating lamps or other discrete visual indicating elements.

Exposure meters used in cameras conventionally utilize a small galvanometer for indicating whether the factors controlling a camera are set to provide film exposure. Because the indication provided by a galvanometer is in the form of a scale reading, precise information is available to a user on which direction and by how much the exposure controls of the camera must be changed to obtain a proper exposure.

The primary disadvantage of this type of exposure meter is its susceptibility to damage due to the delicate and fragile nature of a galvanometer-based exposure meter. More rugged exposure meters are known in which indicating lamps are used instead of a galvanometer. However, these exposure meters provide far less information than the galvanometer type.

It is an object of the present invention to provide a new and improved indicating exposure meter wherein the above described deficiencies are eliminated or substantially overcome.

According to the present invention, there is provided an indicating exposure meter for a camera having adjustable means positionable to set the exposure factors of the camera comprising: an array of indicating elements, each having an inactive and an active state ascertainable by visual inspection; a light measuring circuit including an element having a parameter responsive to light from a scene being photographed; a variable element having a parameter whose value is responsive to the position of said adjustable means; signal generating means responsive to the parameters of the elements for generating a signal whose magnitude is a measure of the extent of photometric imbalance resulting from the current position of the adjustable means; and comparison means responsive to the signal for controlling the state of each of the indicating elements in accordance with the magnitude of the signal so that the magnitude of photometric imbalance is ascertainable from visual inspection of the location of the active indicating elements in the array.

The signal generated by the signal generating means is also a measure of the displacement of the current position of the adjustable means from the position at which photometric balance would result. In response to a change in the position of the adjustable means, the comparison means causes the state of the indicating elements to indicate whether such change is in the direction toward the position at which photometric balance would result. Thus, the state of the indicating elements provides a quantitative as well as a qualitative indication of photometric imbalance.

BRIEF DESCRIPTION OF THE DRAWINGS

Embodiments of this invention are shown in the accompanying drawings, wherein.

DESCRIPTION OF THE PREFERRED EMBODIMENTS

Figures 1, 2:
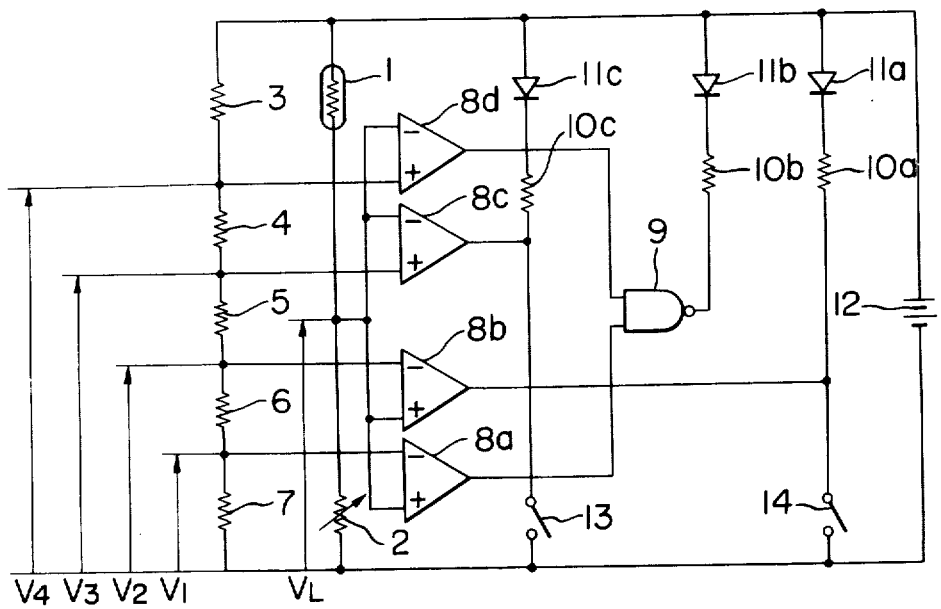
FIG. 1 is a circuit diagram of a first embodiment of the present invention.
FIG. 2 is a chart explaining the function of said first embodiment.
Figure 3:
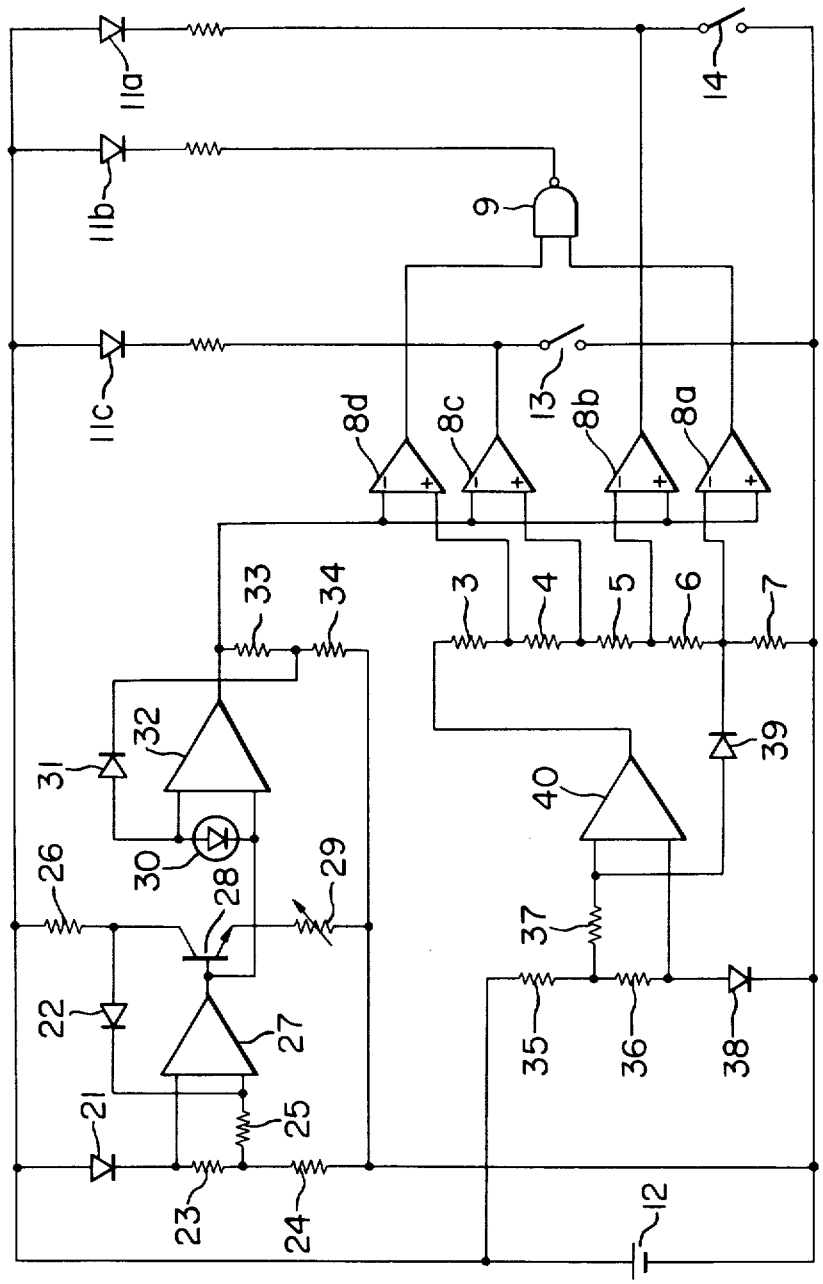
FIG. 3 is a circuit diagram of a second embodiment of the present invention.

The first embodiment shown in FIG. 1 includes a photoconductive element 1, such as CdS, which receives light from a scene being photographed and which has a resistance R1 that varies in accordnce with the intensity of the light. A variable resistor 2 has a resistance R2 regulated according to the setting of the exposure factors of the camera, i.e., lens aperture, film sensitivity, etc. Resistor 2 is connected in series with the photoconductive element 1; and the series connected circuit is connected between the positive and negative terminals of battery 12. Fixed resistors 3, 4, 5, 6 and 7 are connected in series between the positive and negative terminals of battery 12 to constitute a voltage divider circuit. Each of comparing circuits 8a, 8b, 8c and 8d is provided with two input terminals (+ and −) and an output terminal at which a high level potential (hereinafter expressed as H) appears when the potential at the (+) input terminalis higher than that at the (−) input terminal, and at which a low level potential (hereinafter expressed as L) appears in other cases. The output terminals of the comparing circuits 8a and 8d are respectively connected to the two input terminals of NAND gate circuit 9. The output terminal of this circuit will have an L level only when each of the input terminals has an H level.

Indicating elements, shown as light-emitting diodes (hereinafter expressed as LED's) 11a, 11b, and 11c are mounted so as to be visible to the user adjusting the setting of the exposure factors, as for example, in the viewfinder of the camera, for indicating the state of the exposure that can be achieved. Obviously, other types of indicating elements can be used, as for example, electric bulbs. The anode of each of the light-emitting diodes 11a, 11b and 11c is connected to the positive terminal of the battery. The cathode of LED 11a is connected to the output terminal of the comparing circuit 8b through a protecting resistor 10a; the cathode of LED 11b is connected to the output terminal of the NAND gate circuit 9 through a protecting resistor 10b; and the cathode of LED 11c is connected to the output terminal of the comparing circuit 8c through a protecting resistor 10c.

Switches 13 and 14 cooperate with adjustment of the resistance of the variable resistor 2. Switch 13 alone is closed when the setting of shutter speed, lens aperture or film sensitivity is effected to obtain a proper exposure for a light intensity less than the lower limit of the light measuring range of the exposure meter determined by the characteristic of photoconductive element 1. Switch 14 alone is closed when the setting is effected to obtain a proper exposure for a light intensity more than the higher limit of said light measuring range.

V1 is the potential at the connecting point between resistors 6 and 7; V2 is the potential at the connecting point between resistors 5 and 6; V3 is the potential at the connecting point between resistors 4 and 5; V4 is the potential at the connecting point between resistors 3 and 4; and VL is the potential at the connecting point between photoconductive element 1 and variable resistor 2. The voltage VL is dependent on the resistance R1 of photoconductive element 1 (which depends on the light from the scene being photographed), and on the resistance R2 of resistor 2, which depends on the settings of shutter speed, lens aperture and film sensitivity. The present embodiment is designed so that a proper exposure is obtained when a combination of shutter speed, lens aperture and film sensitivity with respect to a light intensity satisfies the relation VL = (V2 + V3)/2. In a state of such proper exposure, as shown in line C in FIG. 2, all the comparing circuits 8a, 8b, 8c and 8d provide H outputs and the output of the NAND gate circuit is at an L level. Thus, only LED 11b is lit, and this state of the LED's indicates proper exposure. In case of a displacement from the state of proper exposure due to a change in the light intensity, shutter speed, lens aperture or film sensitivity, LED 11b remains lit so long as VL remains in the range: V2<VL<V3. When a condition V3<VL<V4 is reached, due to the change of a factor such as light intensity or shutter speed, etc., LED's 11b and 11c are both lit as shown in line D in FIG. 2. When a condition V4<VL is reached, only LED 11c is lit as shown in line E in FIG. 2. Similarly LED's 11a and 11b are both lit as shown in line B in FIG. 2 under the condition V1<VL<V2; and only LED 11a is lit as shown in line A in FIG. 2 when the condition VL<V1 is reached. The states of the LED's shown in lines D and E in FIG. 2, when VL is higher than that required for proper exposure, indicate an overexposure will result since the resistance of photoconductive element 1 is lower than that providing a proper exposure (i.e., the resistance of variable resistor 2 is higher than that providing a proper exposure). Conversely, the states of the LED's shown in lines A and B in FIG. 2 signify an underexposure condition.

If the fixed resistors 3, 4, 5, 6 and 7 are selected in such a way that the voltage V2 is equal to a value of VL for a combination of the light intensity, the lens aperture, the shutter speed and the film sensitivity, providing an underexposure by ⅓ EV, the voltage V3 is equal to a value of VL for a combination providing an overexposure by ⅓ EV, the value of V1 is equal to a value of VL for a combination giving an underexposure by 1 EV, and the value of V4 is equal to a value of VL for a combination giving an overexposure by 1 EV, then an underexposure by at least 1 EV is indicated by state A in FIG. 2, wherein only LED 11a is lit, an underexposure by ⅓ to 1 EV is indicated by state B in FIG. 2, an overexposure by ⅓ to 1 EV is indicated by state D in FIG. 2, and an overexposure by at least 1 EV is indicated by state E in FIG. 2. State C in FIG. 2, wherein only LED 11b is lit, signifies that the combination is within a range of ± ⅓ EV with respect to the proper exposure. Thus, in case of using a film with a relatively wide latitude for incorrect exposure, such as a black-and-white film, a given combination of light intensity, lens aperture and shutter speed, which results in the illumination of LED 11b, will achieve an exposure within the latitude range regardless whether other LED's are lighted. Thus, it is possible to use the camera with a relatively rough adjustment of the variable resistor 2. On the other hand, for a film with a narrow latitude such as a color reversal film, it is necessary to make a fine adjustment of the variable resistor 2 so as to obtain a state where only LED 11b is lit. In this manner, the method of adjustment of the exposure factors can be varied according to the film to be used. In a case where a fine adjustment is required, the first step may be to roughly adjust the aperture ring and shutter dial so as to obtain a rough approximation of the proper exposure if only LED 11a or LED 11c is lighted to indicate that the settings of the aperture ring and shutter dial are considerably distant from the correct combination in the beginning. The final fine adjustments can then be carried out until LED 11b also becomes lit. In this manner, it is made possible to differentiate the fine adjustment from the rough one by reason of three LED's.

When the light intensity is less than the lower limit of the measuring range of the photoconductive element, either LED 11a alone, or each of LED's 11a and 11b is lit when the combination of shutter speed and lens aperture is set at a value which would give a proper exposure for for a light intensity within the measuring range. If the shutter speed and/or lens aperture is regulated to a combination giving a proper exposure for a light intensity less than the lower limit of the measuring range, the resistance of said variable resistor 2 will remain unchanged at a value corresponding to the lower limit, and the switch 13 will be closed to light LED 11c. As the result, either LED's 11a and 11c, or LED's 11a, 11b and 11c will be lit to indicate that the light intensity is outside the measuring range.

Conversely, when the light intensity is greater than the upper limit of the measuring range, the regulation of shutter speed and lens aperture to reach a combination matching such light intensity does not change the variable resistor 2, whose resistance remains unchanged at a value corresponding to said higher limit, but closes the switch 14. As the result the LED's 11a and 11c, or LED's 11a, 11b and 11c, will be lit to indicate that the light intensity is outside the measuring range.

In the foregoing embodiment, only LED 11b is lit when the actual exposure is within ± ⅓ EV with respect to the proper exposure, only LED's 11a and 11b are lit when the actual exposure is within −1 to +⅓ EV with respect to proper exposure, only LED's 11b and 11c are lit when the actual exposure is within −⅓ to 1 EV with respect to proper exposure. It should be understood that these ranges have been arbitrarily selected in accordance with the desired designing conditions. But it is obvious that other ranges can be selected if desired.

A second embodiment of the present invention utilizing a photodiode as the photosensitive element is explained in the following description with reference to FIG. 2.

In this embodiment a constant voltage circuit is composed of diodes 21 and 22, resistors 23, 24, 25, and 26, operational amplifier 27 (hereinafter expressed as OP amplifier), a transistor 28 and a variable resistor 29, whose resistance varies according to the exposure factor setting.

A logarithmic converting circuit is composed of a photodiode 30, a logarithmic converting diode 31, OP amplifier 32, and resistors 33 and 34 to generate a voltage proportional to the logarithm of the light intensity from the object to be photographed. The constant voltage circuit thus provides an output voltage corresponding to the exposure factors. The output terminal of the constant voltage circuit, namely the output of OP amplifier 27, is connected to the cathode of the photodiode 30 in the logarithmic converting circuit, and thus supplies the latter with a bias voltage corresponding to the setting of the exposure factors.

Consequently, OP amplifier 32, constituting the output terminal of said logarithmic converting circuit, provides an output voltage corresponding to the logarithm of the light intensity and the setting of the exposure factors, and the output voltage thus obtained is applied to one of the input terminals of comparing circuits 8a, 8b, 8c and 8d.

Resistors 35, 36, and 37, diodes 38 and 39, and an OP amplifier 40 constitutes another constant voltage circuit of which the output voltage is divided by resistors 3, 4, 5, 6, and 7. The divide voltages thus obtained are supplied to the other input terminals of the comparing circuits 8a, 8b, 8c and 8d in a similar manner as in the first embodiment. The outputs of comparing circuits 8a – 8d will not be influenced by ambient temperature because the temperature characteristics of the constant voltage circuit 35 to 50 are made equal to the sum of the temperature characteristic of the logarithmic converting circuit 30 to 34, and that of the constant voltage circuit 21 to 29. The remaining parts of the circuit and their function are the same as those in the first embodiment.

In both embodiments of the invention, the indicating exposure meter provides an easily visible and mechanically strong indicator by the use of indicating elements such as LED's. In addition, it provides not only a qualitative indication of photometric imbalance, namely over, proper, and underexposure, but also provides a quantitative indication of the extent of photometric imbalance. Also the extent of photometric imbalance can be very exactly determined from the state of the indicator by properly selecting values of fixed resistors 3, 4, 5, 6 and 7. Furthermore, the above-mentioned effects can be achieved by a very simple device, allowing for mass production of the circuit of the present invention and providing a less expensive system as compared with conventional systems, particularly those utilizing a conventional galvanometer in combination with integrated circuits.

I claim:

1. An indicating exposure meter for a camera having adjustable means to set exposure factors of the camera comprising:
   a. first, second and third indicating elements, each having an inactive state and an active state ascertainable by visual inspection;
   b. a photoelectric element for receiving light from an object to be photographed;
   c. control means connected with said photoelectric element and with said adjustable means for producing a proper exposure signal when the combination of the intensity of the light from the object and the exposure factors provides a proper exposure, an over-exposure signal when the combination provides an over-exposure and an under-exposure signal when the combination provides an under-exposure, said first indicating element having an active state produced in response to the over-exposure signal, said second indicating element having an active state produced in response to the under-exposure signal and said third indicating element having an active state produced in response to the proper exposure signal; and
   d. switch means associated with said first indicating element and with said adjustable means, said switch means being normally in a first state and being placed in a second state in response to adjustment of said adjustable means so as to obtain a proper exposure for a light intensity lower than the lower limit of the light measuring range of said photoelectric element for rendering said first indicating element active irrespective of signals from said control means, whereby both the active state of said second indicating element due to said under-exposure signal and the active state of said first indicating element due to the second state of said switch means indicate that said light intensity is lower than the lower limit of the light measuring range of said photoelectric element.

2. An indicating exposure meter according to claim 1, further comprising second switch means associated with said second indicating element and with said adjustable means, said second switch means being normally in a first state and being placed a second state in response to adjustment of said adjustable means so as to obtain a proper exposure for a light intensity higher than the higher limit of the light measuring range of said photoelectric element for rendering said second indicating element active irrespective of signals from said control means, whereby both the active state of said first indicating element due to said over-exposure signal and the active state of said second indicating element due to the second state of said second switch means indicate that said light intensity is higher than the higher limit of the light measuring range of said photoelectric element.

* * * * *